United States Patent [19]
Slaney

[11] Patent Number: 5,285,510
[45] Date of Patent: Feb. 8, 1994

[54] FIBER OPTIC CONNECTOR

[75] Inventor: Paul Slaney, Groton, Mass.

[73] Assignee: The Whitaker Corporation, Wilmington, Del.

[21] Appl. No.: 990,527

[22] Filed: Dec. 15, 1992

[51] Int. Cl.$^5$ .............................. G02B 6/26; G02B 6/38
[52] U.S. Cl. ............................................ 385/78; 385/56; 385/60; 385/66; 385/76; 385/84
[58] Field of Search ................. 385/53, 56, 60, 62, 385/66, 69, 70, 72, 76, 77, 78, 81, 84, 86, 87, 88

[56] References Cited

U.S. PATENT DOCUMENTS

| | | | |
|---|---|---|---|
| 4,184,742 | 1/1980 | Corrales | 385/78 X |
| 4,422,716 | 12/1983 | Morimoto et al. | 385/78 X |
| 4,696,538 | 9/1987 | Despouys | 385/78 X |
| 4,726,647 | 2/1988 | Kakii et al. | 385/78 X |
| 4,747,658 | 5/1988 | Borsuk et al. | 385/78 X |
| 4,812,009 | 3/1989 | Carlisle et al. | 385/76 |
| 4,852,963 | 8/1989 | Lampert | 385/60 X |
| 4,877,303 | 10/1989 | Caldwell et al. | 385/55 X |
| 4,911,518 | 3/1990 | Miller | 385/78 X |
| 5,011,258 | 4/1991 | Takeda | 385/56 X |
| 5,029,973 | 7/1991 | Rink | 385/78 X |
| 5,096,276 | 3/1992 | Gerace et al. | 385/76 |
| 5,129,023 | 7/1992 | Anderson et al. | 385/70 |

OTHER PUBLICATIONS

AMP Incorporated "Fiber Optic Products" Catalog No. 82188 issued: Feb. 1992, pp. 54,56,60–63.

*Primary Examiner*—Brian Healy
*Attorney, Agent, or Firm*—Lahive & Cockfield

[57] ABSTRACT

A fiber optic connector resists signal interruption with a structure that has an inner body, that receives and mounts an optical fiber, and that has an outer body having an axial passage that receives the inner body. The outer body has two sections arranged in axial succession. The outer-body back section mounts a captive element for mechanical coupling with a further optical device with which the connector mates. The forward, second section of the outer body is arranged for limited axial displacement relative to the first section. The connector has structure forming two springs or like resiliently acting elements; one biases the front end of the inner body axially forward relative to the back of the outer body, and the second biases the front of the outer body forward relative to the back section of the outer body.

27 Claims, 9 Drawing Sheets

FIBER OPTIC CONNECTOR

BACKGROUND

This invention relates to connectors for fiber optic cables. In particular, the invention relates to an improved fiber optic connector that allows quick connection and disconnection with mating connectors, and that is resistant to signal interruption.

Fiber optic communication cables typically include at least one light transmitting optical fiber clad in an optically insulating material. The cladding prevents dispersion of light out of the optical fiber. The fiber optic cable usually has a protective external buffer over the clad fiber, typically of a plastic material, such as nylon, which may or may not be removed to terminate the cable. Optical cables usually have an outer protective layer, called a jacket, which is typically made of PVC or polyurethane material. A yarn-like sleeve, typically made of KEVLAR polymer, is often placed between the buffer and the jacket to improve the tensile strength of the cable.

The growing use of fiber optic systems creates a need for a connector capable of optically coupling a segment of fiber optic cable to another optical device, such as an amplifier, diode or other active component; a switch or other circuit; or another segment of fiber optic cable. To achieve efficient light transfer, the connector must align and space the optical elements, with or without touching whichever is specified, with high precision. The alignment and spacing requirements are exceedingly demanding, due to the minute, micron-size diameter of the optical elements (e.g., fibers) being connected, coupled or otherwise terminated. During light transmission through the coupled elements, it is essential to maintain the precision alignment and spacing (or contact) of the coupled elements, otherwise a signal interruption occurs, i.e. the optical coupling deteriorates or fails.

One method of avoiding signal interruption is to design connectors that screw together, or are otherwise permanently or semi-permanently secured together. However, there is a need for optical connectors that resist signal interruption and that also allow quick connection and disconnection with mating connectors.

One problem with known connectors of the quick connect and disconnect type is that they are prone to inadvertent signal interruption. One known optical connector which allows quick connection and disconnection, and is marketed under the ST ® mark, has a captive bayonet nut for mating with a bayonet receptacle, a body for supporting the optical fiber along an axis, and a spring. The body has a front end which exposes a facet end of the optical fiber for optical coupling with another optical element. The spring serves two functions: it pushes the facet end forward, towards the optical interface to maintain optical connection, and it pushes the mating bayonet receptacle to maintain the mechanical coupling of the two bayonet members.

If the back of this prior connector body, or its attached optical cable, is pulled with a force sufficient to compress the spring, the facet end is displaced axially backwards, away from the mating optical element, and signal interruption occurs. A signal interruption can also result from lateral forces applied on the back of the connector and which displace the facet end of the connector laterally, thus causing optical disconnect through fiber misalignment.

Another problem with known quick connect and disconnect connectors is that they provide only limited protection of the coupled optical elements from corrosive agents in the operating environment. There accordingly is a need for optical quick connect and disconnect connectors that can operate in hostile environments, such as in the presence of moisture or dust.

Accordingly, an object of this invention is to provide a fiber optic connector that allows quick connection and disconnection with ST ® compatible and other optical connectors, and that resists signal interruption, even when the connector or its associated optical cable is stressed, either axially or laterally.

It is also an object of the invention to provide a fiber optic connector that accommodates an environmental seal for sealing out moisture, dust, and like contaminants.

These and other objects and features of the invention will be apparent from the following description and the drawings.

SUMMARY OF THE INVENTION

A fiber optic connector according to the invention has a captive element for mechanical coupling with a further optical connector, and has an inner body, an outer body, and two resilient elements. The connector can be quickly connected or disconnected to mating optical connectors; and when connected, it resists signal interruption even if the connector, or the associated optical cable, is stressed.

The connector inner body has an axially extending through passage for receiving and mounting an optical fiber with selected alignment. The inner body has a front facet end for exposing a facet of the optical fiber for optical coupling with another optical element. The front facet end is at the front end of the connector.

The connector outer body has two axially successive sections. A first, rear section has an axially extending through channel for receiving the inner body, so that the inner body can slide, telescopically and axially, relative to the first section. The first section also has a mechanism for securing the captive element. A second section forms the front end of the outer body and is arranged for axial displacement relative to the first section.

The first resilient element biases the inner body axially forward, relative to the outer body, to push the facet towards a mating optical element.

The second resilient element biases the front end of the outer-body second section forward relative to the first section.

In one preferred connector embodying the invention, the second section of the outer body contacts a surface of the mating device, typically an adapter or receptacle, when the connector is mechanically coupled with the mating device.

The outer-body second section is, in one embodiment, slideably mounted to the first section. The second resilient element is disposed between the outer-body first and second sections to bias the second section forward relative to the first section. The second resilient element is normally under compression and pushes the outer-body second section toward its maximum forward position. When the connector is mechanically coupled with a mating device, the outer-body second section is axially displaced rearward. This displacement further compresses the second resilient element. The compressive force exerted by the second resilient element is transferred to the mating device to maintain the mechanical coupling. In one embodiment, this resilient force maintains the mechanical coupling because adaptor lugs of the mating device are trapped by a bayonet slot of the captive element.

In another embodiment, the outer-body second section has a resilient sleeve or collar-like structure fixed to the outer-body first section. The outer-body second section compresses or deflects axially when the connector is mechanically coupled with a mating device, and the resiliency of the second section provides a resilient force that maintains the mechanical coupling. In this embodiment, the second resilient element is formed by the resilient structure of the outer-body second section.

Other aspects of the invention will be more apparent from the following description and the drawing.

DESCRIPTION OF THE ILLUSTRATED EMBODIMENTS

Figure 1:
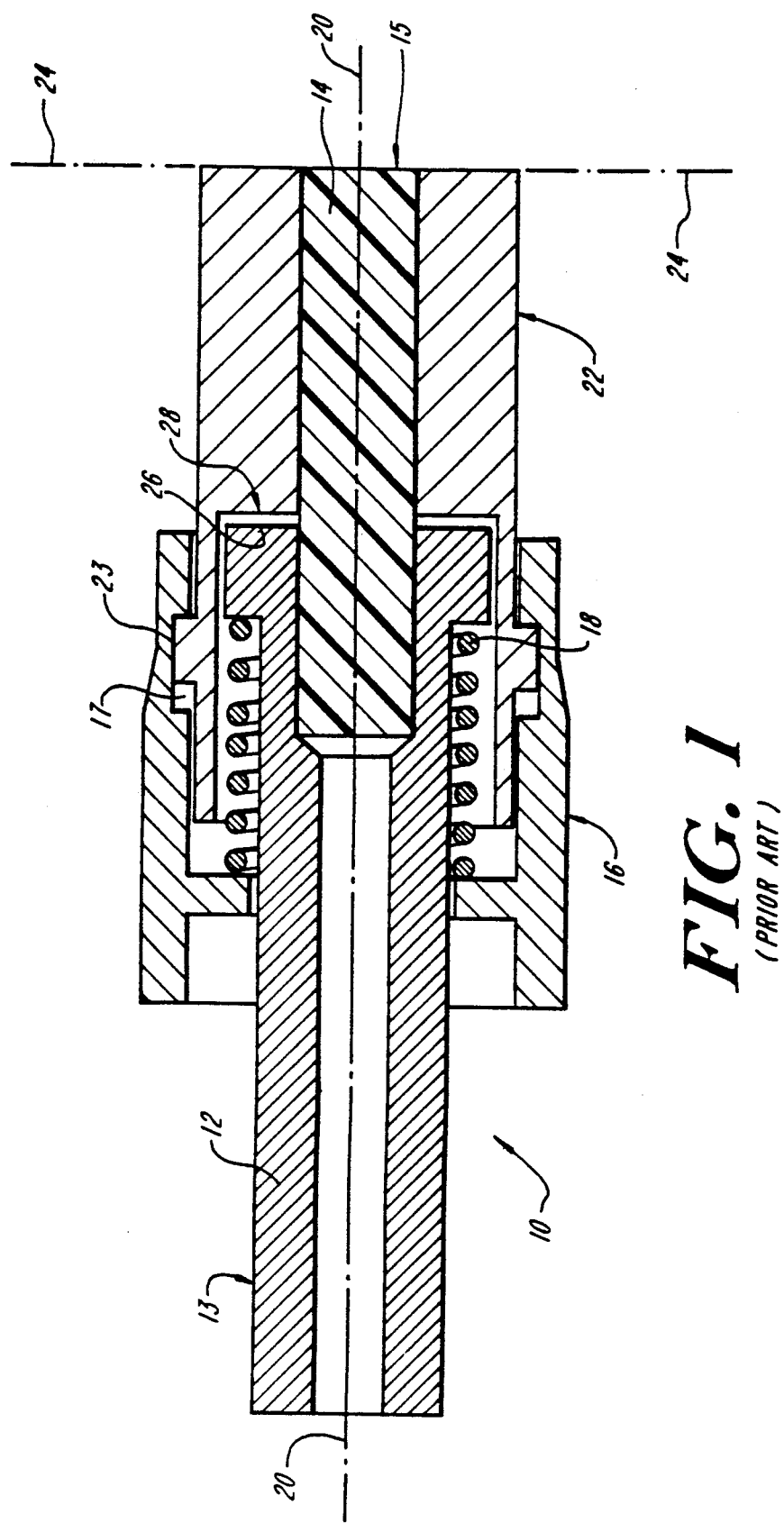
FIG. 1 is a longitudinal sectional view of a prior optical connector of the quick connect and disconnect type mated with an adaptor.

FIG. 1 shows a prior quick connect and disconnect bayonet type optical connector 10 mechanically coupled with a mating adaptor 22. The connector has a body 13, a bayonet nut 16, and a spring 18. The illustrated body 13 is fabricated with a ferrule 14 and a ferrule holder 12. The body 13 supports an optical fiber along an axis 20 within a central passage extending throughout the length of the connector. The optical fiber terminates at a front facet end 15 of the ferrule 14. A spring 18 biases the body 13 forward (to the right in the drawing) relative to the bayonet nut 16, so that the facet end 15 is maintained at an optical interface 24. In practice, the optical fiber is optically coupled to another optical element, typically another optical fiber, located on the other side of optical interface 24.

Mechanical coupling between the adaptor 22 and the connector 10 is achieved when an adaptor lug 23 is trapped in a slot 17 in the bayonet nut 16. In addition to providing a resilient force that keeps the facet end 15 biased towards the optical interface 24, the compressive force exerted by the spring 18 maintains the mechanical coupling between the adaptor 22 and the connector 10 by maintaining the adaptor lug 23 seated within the bayonet slot 17.

When the connector 10 is coupled with the adaptor 22, the body 13 is displaced rearwards (to the left in the drawing) from its disconnected position. This displacement occurs because surfaces of the adaptor (not shown) push on the facet end 15. The displacement is such that there is normally a space between the surface 26 of the body 13 and the opposed surface 28 of the adaptor 22.

The connector 10 of FIG. 1 can suffer from signal interruption if the facet end 15 is inadvertently displaced rearwards, away from the optical interface 24. Tension on the body 13 sufficient to compress the spring 18 will cause this rearward displacement and hence signal interruption. This tension typically results from tension on the optical cable (not shown) attached to the back end of the body 13. The connector 10 structure suffers from inadvertent signal interruption because tension anywhere on the body 13, if it is sufficient to compress the spring 18, is transferred to unwanted motion of the facet end 15.

FIGS. 2, 2A, 2B, 2C, and 2D show a connector 30 according to the invention and that is resistant to signal interruption. The connector 30, shown in FIG. 2 disconnected from the adaptor 22, has an inner body 43, an outer body 39, a bayonet-type coupling nut 36, and two resilient elements 32 and 34. In the illustrated connector 30, these resilient elements are coil springs. As will be apparent to those skilled in the art, other embodiments of the resilient elements can be used, for example resilient element 32 can be a bellows-like spring attached to the outer body 39.

The illustrated outer body 39 has a first section 38 and a second section 40. The first section 38 has a tubular shape with an inner passage 53 for receiving the inner body 43. The inner passage has three axially successive cylindrical compartments 53A, 53B, and 53C, concentric with the axis 48 and each with a different diameter. The middle compartment 53B houses the resilient element 32 which is located radially inner-wise relative to the other resilient element 34, and the back end of which abuts a radial shoulder 54 formed at the junction of the rear and middle compartments of the inner passage. As shown in FIG. 2D, middle compartment 53B has an inner hexagonal cut 38a at its forward end to prevent rotation of ferrule holder 45, relative to first body section 38, which has a corresponding outer hexagonal cut 45a. The inner passage forward compartment 53C houses the resilient element 34. A shoulder 56 at the juncture of the middle and forward compartments abuts a back end of the outer resilient element 34. The forward end of the first body section 38 forms an opposing shoulder 58. The outer surface of the first body section 38 traps the bayonet nut 36 between two opposing radially grooved shoulders.

With further reference to FIG. 2, 2A, 2B, 2C, and 2D, the second section 40 of the illustrated connector outer body 39 is a relatively short tubular collar, concentric with the axis 48 and having a cylindrical inner passage that slideably receives the ferrule 42 of the connector inner body 43. The second section 40 accordingly can slide axially relative to the first section 38. The axial back end of the second body section has a flange 57 that is slideably received within the forward passage compartment 53C of the first body section 38. The shoulder 58 of the first body section 38 traps the flange 57, to secure the second body section 40 to the first body section 38 and to limit the forward axial movement of the second body section. Further, the front end of the illustrated coil spring that forms the resilient element 34 is compressively engaged between the shoulder 56 and the flange 57 to resiliently urge the second body section 40 axially forward, to the extreme forward position of FIG. 2, relative to the first body section 38.

The inner body 43 of the illustrated connector 30 has a cylindrically shaped ferrule 42 secured to a hex portion ferrule holder 45, each concentric with axis 48. The hexagonal keying section 45A of ferrule holder 45 slides within the corresponding inner hexagonal middle compartment 53C of inner passage 53 and prevents undesirable rotation of ferrule holder 45 relative to first body section 38 of outer body 39. The inner body 43 supports an optical fiber along the axis 48 within a passage 59 extending from the rear of the inner body 43 to a front facet end 47 of the ferrule 42. The illustrated passage 59 has a relatively large diameter in the ferrule holder 45, to receive the buffer on a cable, and has a relatively small precission diameter in the ferrule, to receive and position an unbuffered fiber. The ferrule holder 45 has a cylindrical rear stub 46 and a forward portion 44 with a larger diameter.

The ferrule holder 45 forms, at the juncture of the stub 46 and the forward portion 44, a shoulder 55 that abuts a forward end of the inner resilient element 32. A feeder tube 52 is typically attached to the stub 46 and extends to the back of the outer-body first section 38. The diameter of the feeder tube 52 is slightly smaller than the diameter of the inner passage rear compartment of the outer-body first section 38. The hexagonal width of the ferrule holder hexagonal keying section 45A is slightly smaller than the width of the corresponding inner hexagonal middle compartment 53C of outer-body first section 38, thus allowing the inner body 43 to slide axially within the outer-body 39. The ferrule 42 has a smaller diameter than the inner diameter of the ferrule holder 45 forward portion 44. A shoulder 61 formed at the juncture of the ferrule 42 and the forward portion 44 abuts the opposing shoulder 60 formed by the outer-body second section 40. The ferrule 42 projects concentrically through the central passage of the outer-body second section 40.

The illustrated coil spring that forms the inner resilient element 32 is disposed within the inner cavity middle compartment 53B of first section 38, between the axially opposed shoulders 54 and 55. The resilient element 32 is normally under compression and exerts a force which biases the inner body 43 forward relative to the outer-body first section 38, thus pushing the facet end 47 of the connector forward, towards an optical interface 50. Rearward motion of the inner body 43 is resisted by the force exerted by the first resilient element 32, and forward motion of the inner body 43 is restricted by the abutment of shoulders 60 and 61.

With this structure of the connector 30, the inner body 43 can translate axially relative to the outer body 39, and particularly relative to the outer-body first section 38. This relative axial movement is limited by interfering surfaces and is resiliently biased by the inner resilient element 32. In addition, the outer-body second section 40 can deflect axially relative to the first section 38, under the resilient bias of the outer resilient element 34 and limited by interfering surfaces.

Figure 2:
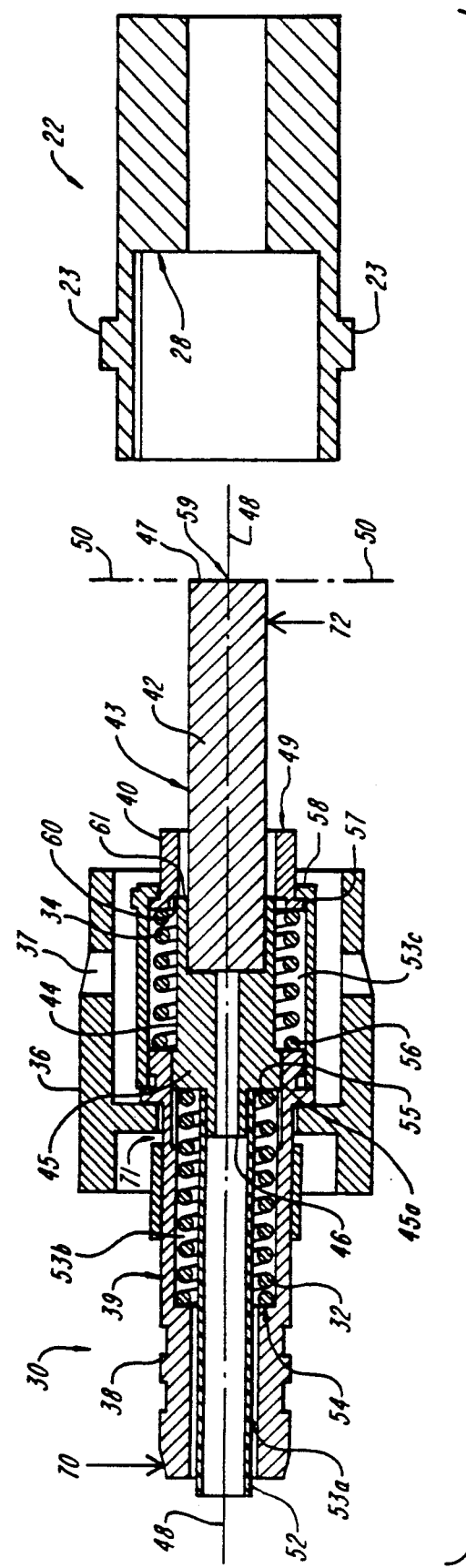
FIG. 2 is a longitudinal sectional view of a connector according to the invention, separated from a mating adaptor.

With further reference to FIG. 2, the axial length of the inner body 43, formed by the holder 45 and the ferrule 42, is sufficient to secure an optical fiber to the connector and to position and support it both axially and radially. The axial length of the outer body 39 is sufficient to supportingly mount the holder 45 of the inner body and to mount and confine the resilient elements 32 and 34. The back-most, first section 38 of the illustrated outer body 39 extends axially for the major portion of the overall outer-body length, and the front-most second section 40 has considerably less axial length.

Figure 2C:
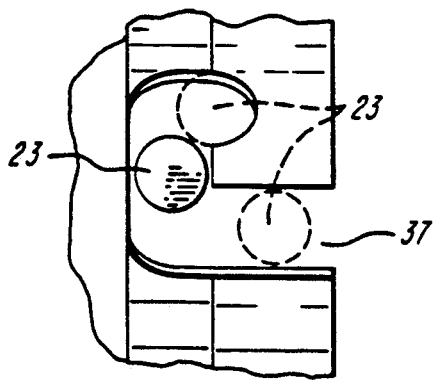
FIG. 2C is a top view showing the bayonette slot detail of the connector of FIG. 2.
Figure 2A:
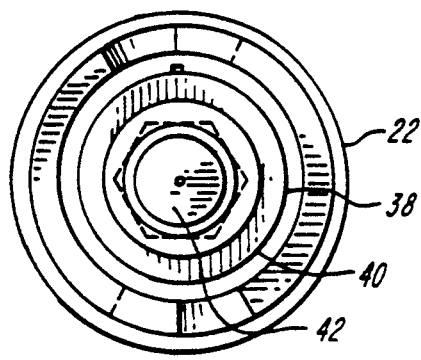
FIG. 2A is a front end view of the connector of FIG. 2.
Figure 2B:
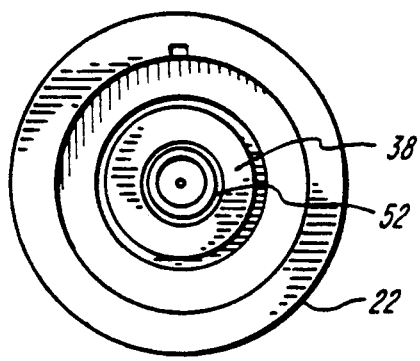
FIG. 2B is a rear end view of the connector of FIG. 2.
Figure 2D:
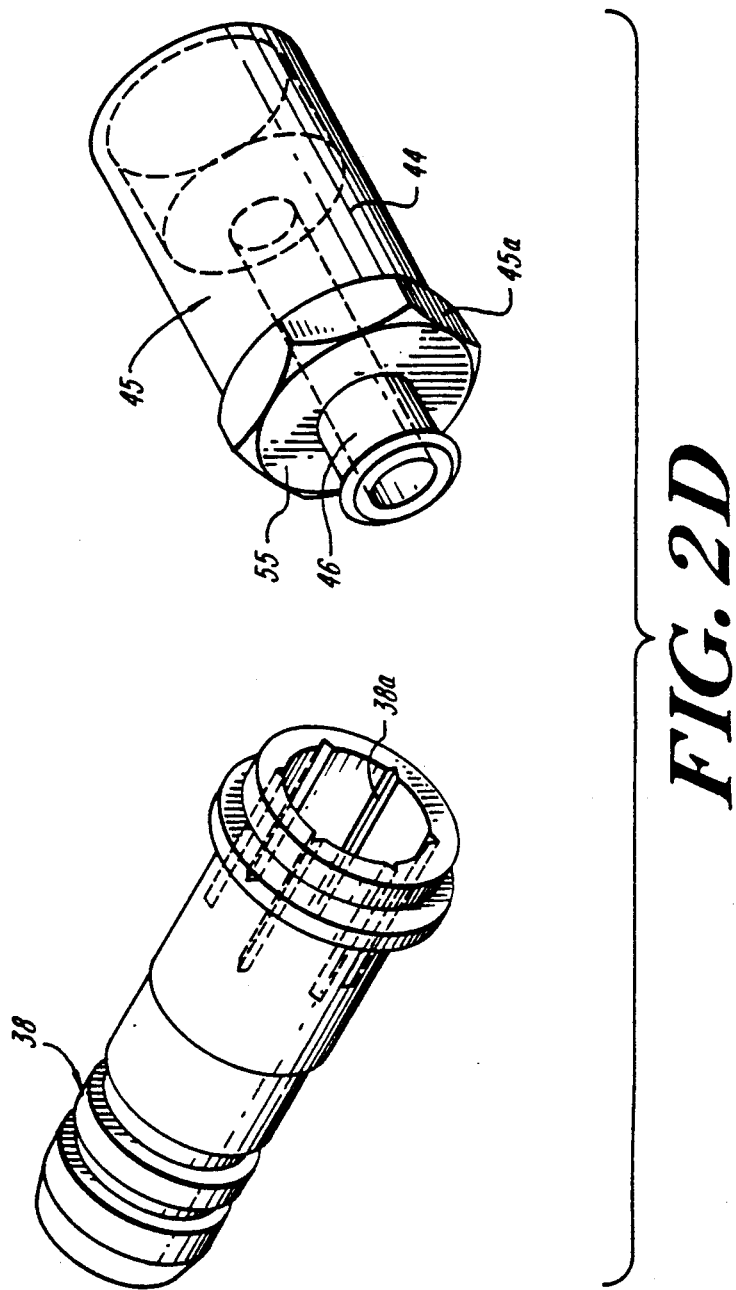
FIG. 2D is a transparent view of two mating components of the connector of FIG. 2.

With reference to FIG. 2, and in particular FIG. 2C, the structure of the bayonet nut 36 is well known in the art, and has a bayonet slot 37 for receiving and trapping adaptor lugs 23.

Figure 3:
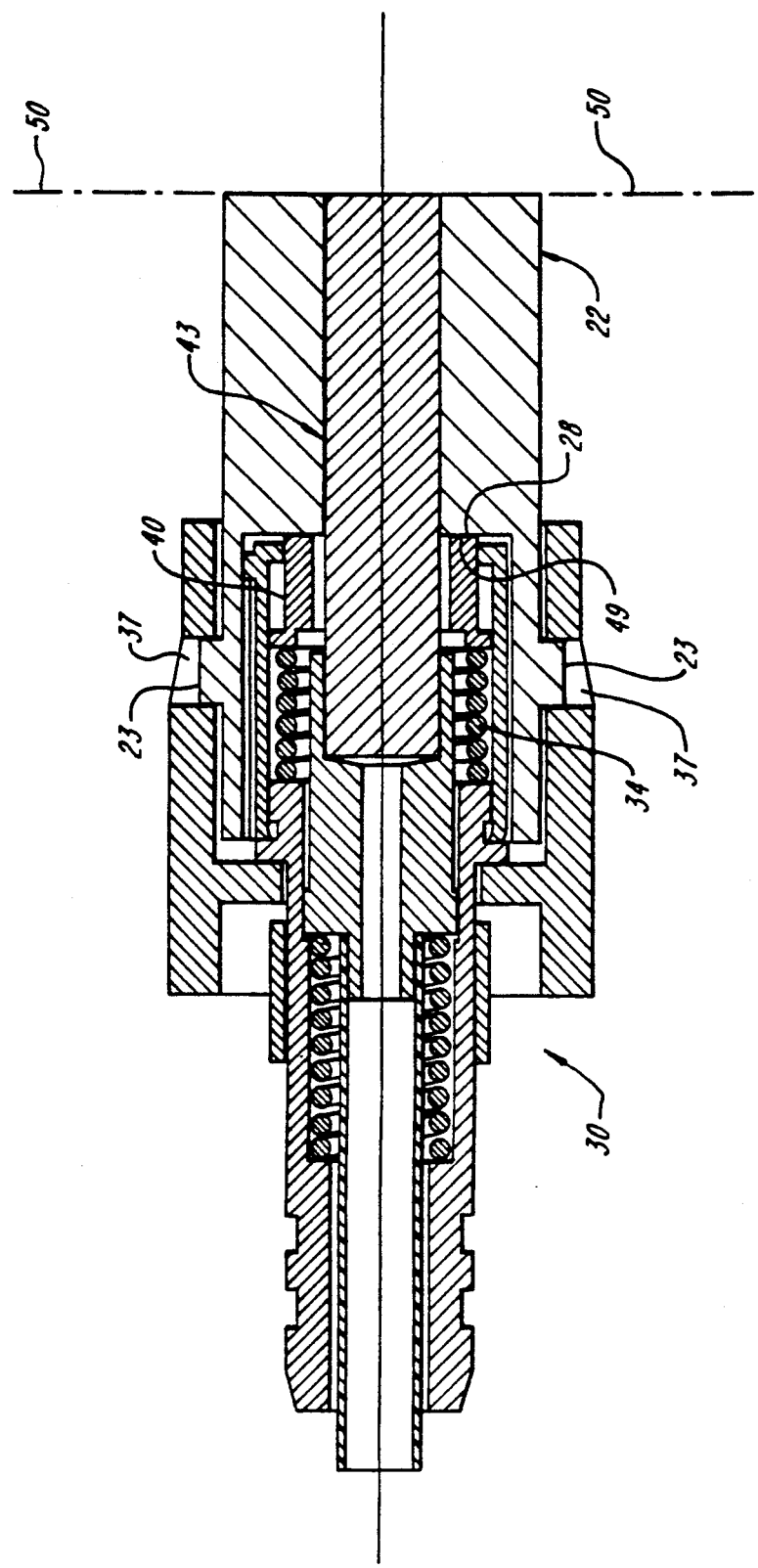
FIG. 3 is a sectional view of the connector of FIG. 2 at an intermediate state of the process of mechanically coupling with a mating adaptor.
Figure 4:
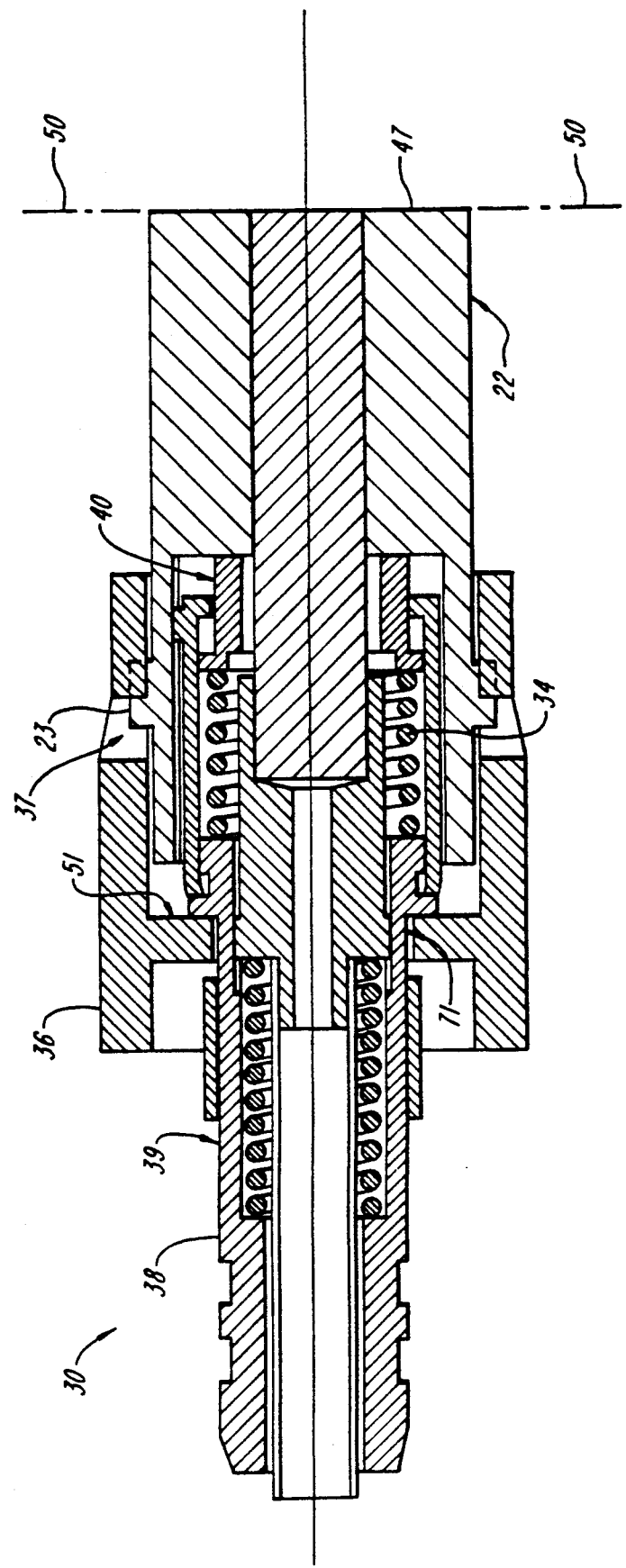
FIG. 4 is a sectional view of the connector of FIG. 2 mated with an adaptor.

With reference to FIGS. 3 and 4, when the connector 30 is mechanically coupled with the adaptor 22, a frontal surface 49 of the outer-body second section 40 abuts a surface 28 of the adaptor 22. FIG. 3 shows the connector 30 in the process of being mechanically coupled with the adaptor 22. The adaptor lug 23 is at an intermediate position within the bayonet slot 37, the outer resilient element 34 is maximally compressed, and the outer-body second section 40 is displaced axially to its furthest rearward position.

FIG. 4 shows the connector 30 fully coupled to the adaptor 22. The outer-body second section 40 transfers the force exerted by the resilient element 34 to the adaptor 22, and this force maintains the mechanical coupling because the adaptor lug 23 is trapped by the bayonet slot 37, as shown in FIG. 2C.

The connector 30 resists signal interruption because, when the connector 30 is coupled to the adaptor 22, the outer-body first section 38 and the bayonet-nut 36 it carries mechanically transfer to the adaptor 22 tension exerted on the rear of the connector, or its associated optical cable (not shown); the connector structure in essence isolates the tension from the connector facet end 47 and hence from the optical interface 50. The adaptor 22 and the connector outer-body first section 38, with the bayonet nut 36, when coupled together, form an optically rigid assembly, rather than multiple pieces coupled by a spring which maintain optical communication directly by tensional components. The connector facet end 47 can displace axially backwards by backward displacement of the inner body 43 relative to the outer-body first section 38 in response to compressive engagement exerted on the other side (rightmost in FIG. 4) of the optical interface to prevent damage or crushing of the optical elements, but the facet end 47 does not displace relative to the optical interface 50 in response to tension on the exterior of the connector 10 or the adaptor 22.

As further shown in FIG. 2, a lateral force applied at the back of the connector 30, i.e., in the direction of vector 70, produces an opposite lateral motion at the facet end 47 in the direction of vector 72. This -is true of prior connectors as well as the connector 30 of the present invention. If the lateral motion at the facet end is sufficiently large, signal interruption will result, because the optical fiber will no longer be properly aligned with the mating optical element at the optical interface 50. It is common for connectors to suffer from this kind of signal interruption if the forces are sufficiently large. However, the connector 30 of the present invention provides improved performance at resisting signal interruption in the presence of lateral forces. The relatively rigid mechanical coupling of the outer-body first section 38 to the bayonet nut 36 via contacting sleeve rings 71, rather than by a spring as in the prior art, causes the connector to be more resistant to misalignment from lateral forces. The relatively small lateral play that is possible is compensated for by the resiliently-biased support of the inner body.

Figure 5:
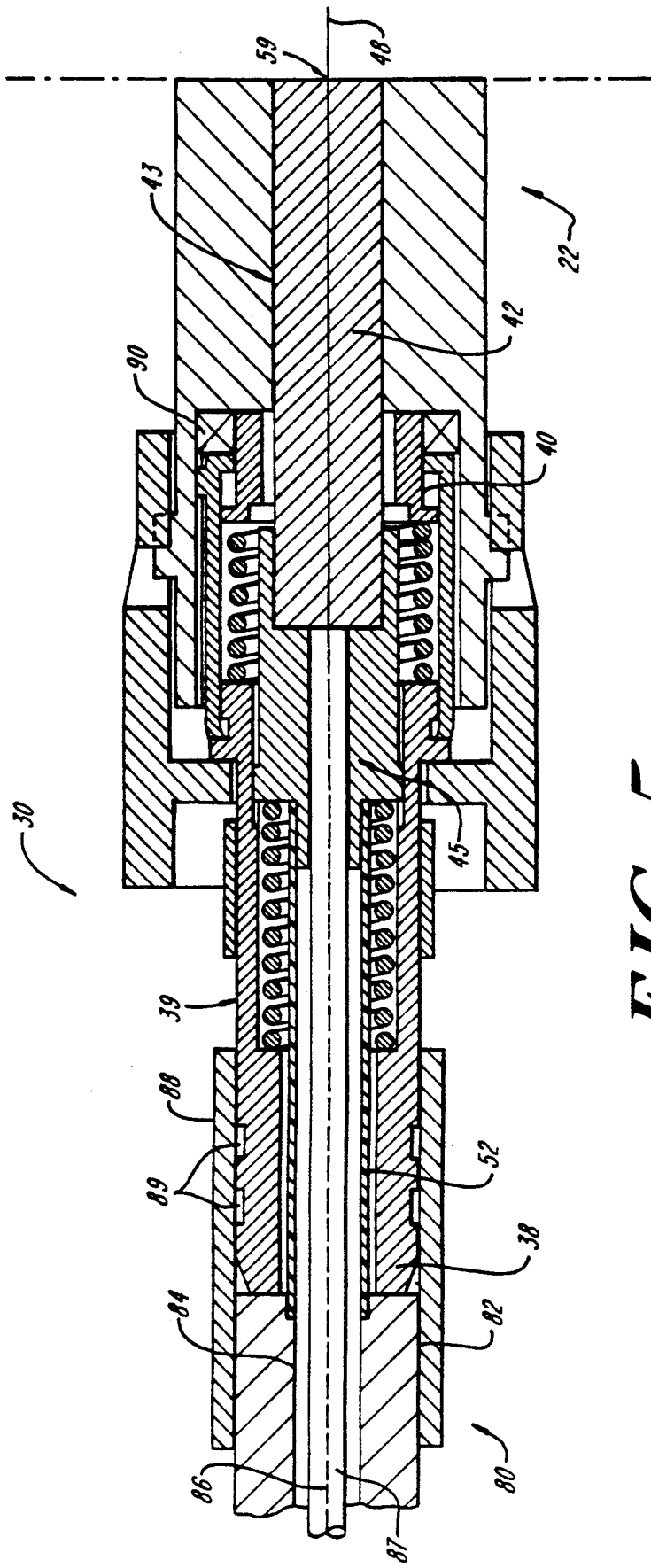
FIG. 5 is a sectional view of a connector according to the invention mated with an adaptor, and additionally showing an environmental seal and an attached optical cable.

FIG. 5 shows the connector 30 attached to an optical cable 80 that has a buffer 87 surrounding the optical fiber 86, and a protective jacket 82 covering the yarn-like sleeve 84.

The optical fiber 86 is secured to the inner body 43, typically with adhesive material such as glue or epoxy within the inner body 43. In one preferred practice, the epoxy adhesive is injected into the inner-body passage 59 with a syringe, and then the optical fiber is inserted into the passage along the axis 48. The feeder tube 52 functions as a barrier to prevent the adhesive from leaking or spilling into other portions of the connector. After the adhesive is applied, the connector 30 is assembled with the cable 80 by threading the fiber 86 into the ferrule 42 and inserting the buffer 87 into the feeder tube 52 and through the ferrule holder 45 until it abuts the back of the ferrule 42. The cable jacket 82 is stripped to expose a length of the buffer 87 such that when the buffer 87 abuts the back of the ferrule 42, the jacket 82 abuts the back end of the outer body 39. The yarn-like cable sleeve layer, if present, can be pulled over the outer body 39. A crimp sleeve 88 is then applied to span over both the optical cable 80 and the outer-body first section of the connector 30. The outer-body first section 38 preferably has a tapered edge 91 to assist applying the crimp sleeve 88. The crimp sleeve 88 closes over the rear of the outer body 39 and a portion of the jacket 82. The annular grooves 89 help captivate the crimp sleeve 88.

FIG. 5 also illustrates the provision of an optional environmental seal in the connector 30, according to the invention. In this embodiment, the connector outer body 39 carries an annularly shaped seal 90 disposed over the outer-body second section 40. When the connector 30 is mated with the adaptor 22, the seal 90 abuts a radially-extending surface of adaptor 22. This contact forms an environmental seal that seals out corrosive agents such as water, dust and the like. It will now be apparent that the connector 30 can attain such a protective seal by providing an annular seal, similar to the seal 90 of FIG. 5, on the adapter 22. That is, the seal 90 of FIG. 5 can be provided on either the connector 30 or on the adapter 22. It may also be advantageous to provide such seals on both the connector and on the adapter.

Figure 6:
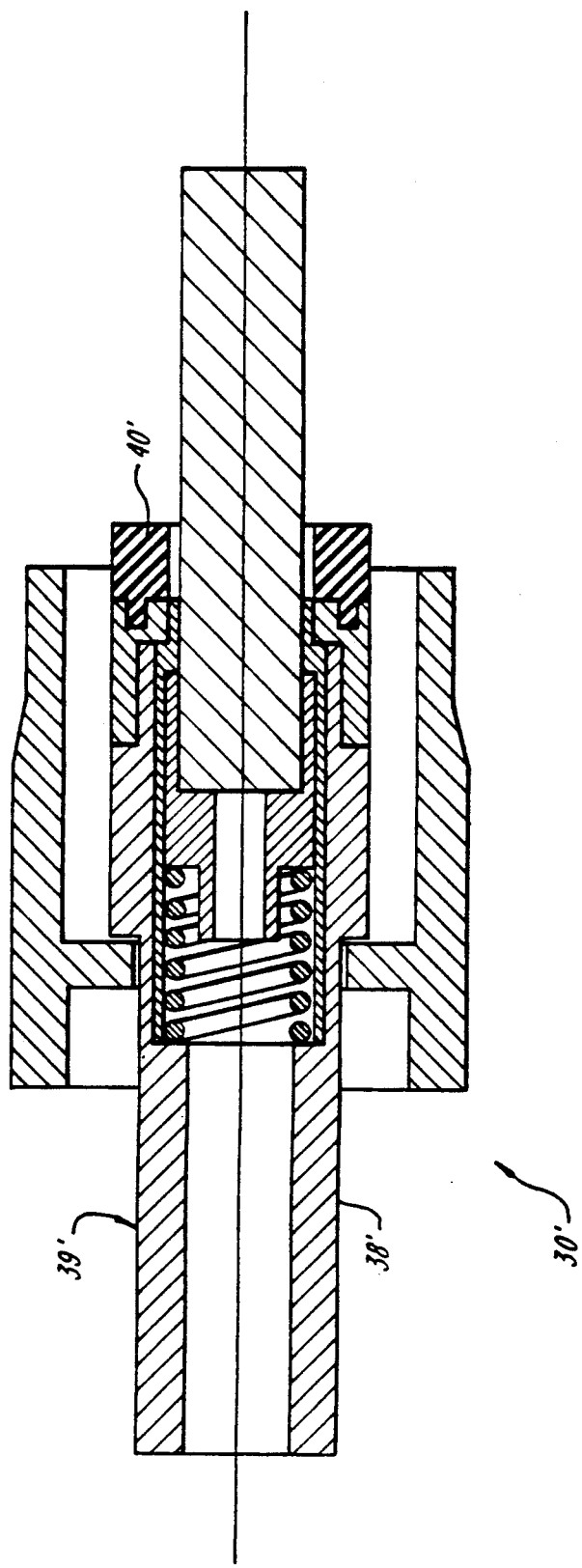
FIG. 6 is a longitudinal sectional view of another connector according to the invention wherein the second section of the outer body is fixed to the outer-body first section.
Figure 7:
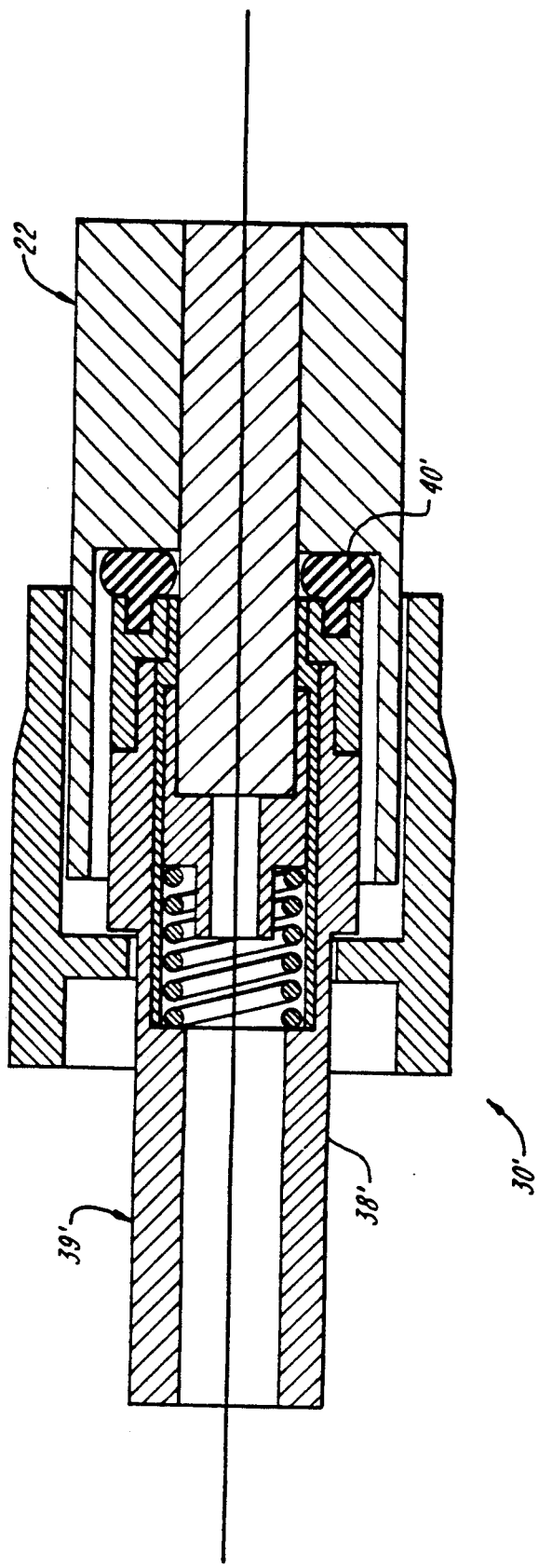
FIG. 7 is a sectional view of the connector of FIG. 6 connected with a mating adaptor.

FIG. 6 illustrates another connector 30' according to the invention, in which the outer-body second section 40' has an axially deflecting structure. This is in contrast to the rigid collar-like structure of FIG. 2 which telescopically slides axially relative to the outer-body first section 38. More particularly, the illustrated connector 30' of FIG. 6 can be identical to the connector 30 of FIG. 2, except that the outer-body second section 40' is fixedly secured at the forward end of the first section 38', and is resiliently axially collapsible. To this end, the second section 40' can employ a resilient compressive sleeve or, alternatively, a bellows sleeve. The resiliency of the sleeve provides the resilient force supplied by the outer spring element 34 of the FIG. 2 connector 30. The outer-body second section 40' thus both forms part of the connector outer body 39 and constitutes the outer resilient element 34 of FIG. 2 for the connector 30'. Moreover, the resilient deflection of the outer-body second section 40' can provide a sealing engagement with the mated adapter 22, thereby cooperating with or replacing the seal 90 of the FIG. 5 connector 30. FIG. 7 shows the connector 30' mechanically coupled to the adaptor 22.

The forgoing description is merely illustrative and those skilled in the art will understand other modifications to the described device. Such the modifications and improvements are to be encompassed within the scope of the following claims.

Further, the invention has been described with particular reference to a connector of the quick connect and disconnect type. It will be apparent to those skilled in the art that the structural connector features which the invention provides can be advantageously used in other types of connectors.

What is claimed is:

1. In a fiber optic connector for optically coupling an end face of an optical fiber to a further optical device or fiber, the connector having a front end, a back end, and a captive element for mechanical coupling with the further optical device, and being arranged for supporting the optical fiber along an axis extending between the connector front and back ends, the improvement comprising
   A) an inner body having axially spaced front and back ends and having an axially extending through passage for receiving and mounting the optical fiber with selected alignment,
   B) an outer body
      i) having axially spaced front and back ends, and having first and second sections in axial succession between said ends, with said second section forming said outer-body front end,
      ii) said outer body having means for securing the captive element to said first section,
      iii) said outer body having a first axially extending through channel for receiving said inner body for axial movement relative to said first section along the axis,
   C) means forming first resiliently acting means for resiliently biasing said front end of said inner body axially forward relative to said back end of said outer body, and
   D) means forming second resiliently acting means for resiliently biasing said front end of said outer body axially forward relative to said first section of said outer body, whereby
   whereby said inner body can be displaced axially relative to said outer body first section in response to a compressive engagement on said inner-body front end.

2. In a connector according to claim 1, the further improvement in which said first resiliently acting means includes a first spring element engaged between said inner-body and said outer-body first section.

3. In a connector according to claim 2, the further improvement in which said first spring element is a coil spring.

4. In a connector according to claim 1, the further improvement in which said first resiliently acting means is normally stressed, and becomes increasingly stressed as said inner body is axially displaced toward said outer-body back end.

5. In a connector according to claim 1, the further improvement in which said outer-body first section has a first radial shoulder, and said inner-body has a second radial shoulder axially opposed to said first radial shoulder, wherein said first resiliently acting means is compressively engaged between said opposed shoulders.

6. In a connector according to claim 1, the further improvement in which said outer-body second section includes tubular collar means disposed concentrically around said inner body.

7. In a connector according to claim 1, the further improvement in which the forward end of said outer-body second section is axially movable backward relative to said outer-body first section in response to engagement on said second section, and said second resiliently acting means is increasingly stressed in response to the backward movement.

8. In a connector according to claim 7, the further improvement in which said second resiliently acting means is normally stressed and becomes increasingly stressed as said outer-body second section is axially displaced toward said outer-body back end.

9. In a connector according to claim 8, the further improvement in which said outer-body first section has a third radial shoulder, and said outer-body second section has radial flange means axially opposed to said third shoulder, and wherein said second resiliently acting means is compressively engaged between said opposed flange means and said third shoulder.

10. In a connector according to claim 9, the further improvement in which said outer-body first section has a fourth radial shoulder, arranged for contacting said flange means when said outer-body second section is displaced to a forward position, for limiting the forward axial displacement of said outer-body second section.

11. In a connector according to claim 1, the further improvement in which said outer-body first and second sections are separate parts and said second resiliently acting means includes a second spring element engaged between said outer-body first and second sections.

12. In a connector according to claim 11, the further improvement in which said second spring element is a coil spring.

13. In a connector according to claim 1, the further improvement in which said inner body has a radial shoulder and said outer-body second section has a radial shoulder disposed axially opposed to said inner-body shoulder for limiting the forward axial displacement of said inner body.

14. In a connector according to claim 1, the further improvement in which said second resiliently acting means is normally stressed when the connector is disconnected from the further optical device.

15. In a connector according to claim 14, the further improvement in which said second resiliently acting means is increasingly stressed when the connector is connected to the further optical device.

16. In a connector according to claim 1, the further improvement in which said outer-body second section is arranged to abut the further optical device when the connector is coupled with the further optical device.

17. In a connector according to claim 16, the further improvement in which said outer-body second section is disposed, relative to said outer-body first section, in a first axial position when the connector is disconnected from the further optical device, and is axially displaced backward, in opposition to a force of said second resiliently acting means, to a second axial position when the connector is mated with the further optical device.

18. In a connector according to claim 16, the further improvement in which said outer-body second section includes means for biasing the further optical device away from said connector back end when the connector is coupled with the further optical device.

19. In a connector according to claim 1, the further improvement comprising annular sealing means carried on said outer-body second section and arranged for abuttingly contacting the further optical device when the connector is coupled with the further optical device.

20. In a connector according to claim 19, the further improvement in which said sealing means is disposed concentrically around said inner body.

21. In a connector according to claim 1, the further improvement in which said outer-body second section is fixed to said outer-body first section and is arranged to abut the further optical device where the connector is coupled therewith.

22. In a connector according to claim 21, the further improvement comprising resilient sleeve means forming, at least in part, said outer-body second section, said sleeve means being arranged for abuttingly engaging the further optical device when the connector is coupled to the further optical device, and forming, at least in part, said second resiliently acting means.

23. In a connector according to claim 1, the further improvement comprising feeder tube means disposed along the axis within said channel concentrically within said outer body, said feeder tube having a front end attached to said inner-body back end and having a back end proximal to said outer-body back end.

24. In a connector according to claim 23, the further improvement in which said optical fiber is secured to said inner body by an adhesive material, and said feeder tube confines said adhesive material.

25. In a connector according to claim 1, the further improvement comprising sealing means carried on at least one of said outer body and the further optical device, said sealing means being disposed to compressively abut said outer-body second section when the connector is coupled with the further optical device.

26. In a connector according to claim 1, the further improvement in which said inner-body front end is the connector front end.

27. A fiber optic connector for optically coupling an end face of an optical fiber to a further optical element or fiber, said connector comprising
   A) a captive element for mechanical coupling with a further optical device,
   B) an inner body having axially spaced front and back ends and having an axially extending through passage for receiving and mounting the optical fiber with selected alignment,
   C) an outer body
      i) said outer body having a first through channel for receiving said inner body for axial movement relative to said first section along the axis,
      ii) having axially spaced front and back ends, and having first and second sections in axial succession between said ends,
      iii) said outer body having means for securing said captive element to said first section, and
      iv) said second section forming said outer-body front end and being relatively proximal to the connector front end, and being arranged for selected backward axial displacement of said outer-body front end, relative to said first section, from a first forward position.
D) means forming first resiliently acting means for resiliently biasing said front end of said inner body axially forward relative to said back end of said outer body, and
E) means forming second resiliently acting means for resiliently biasing said front end of said outer body axially forward relative to said first section of said outer body.

* * * * *